J. T. HARDS.

Improvement in Thill-Couplings.

No. 128,797.                                      Patented July 9, 1872.

Witnesses:                                  Inventor:  
R. C. Dieterich                            James T. Hards.  
W. A. Graham                      Per  
                                               Attorneys.

128,797

UNITED STATES PATENT OFFICE.

JAMES T. HARDS, OF GENEVA, ILLINOIS.

IMPROVEMENT IN THILL-COUPLINGS.

Specification forming part of Letters Patent No. 128,797, dated July 9, 1872.

Specification describing a new and useful Improvement in Thill-Coupling, invented by JAMES T. HARDS, of Geneva, in the county of Kane and State of Illinois.

Figure 1:
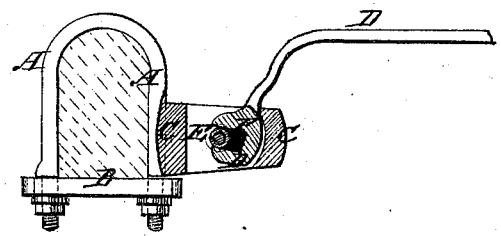
Figure 2:
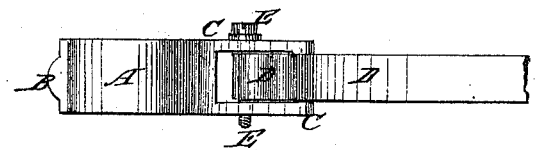

Figure 1 is a side view of my improved thill-coupling, part being broken away to show the construction. Fig. 2 is a top view of the same.

Similar letters of reference indicate corresponding parts.

My invention has for its object to furnish an improved thill-coupling, simple in construction, strong, durable, not liable to get out of order, which may be coupled and uncoupled without trouble, shall be noiseless in operation, shall couple close to the axle, and be neat and trim in appearance; and it consists in the thill-coupling constructed as hereinafter described.

A represents the clip and B the yoke of the coupling, which are constructed and attached to the axle in the ordinary manner. Upon the forward arm of the clip A, above the end of the yoke B, is formed a chamber, C, having a rectangular hole formed through it to serve as a socket for the head of the thill-iron. The front bar of the said chamber C is concaved upon its inner surface upon the arc of a circle, as shown in Fig. 1. The head of the thill-iron D is made convex upon its forward side, when in working position, to fit into and rest against the concaved forward inner surface of the said chamber C to support the draft strain. The head of the thill-iron D is slotted transversely upon its rear side, when in working position, to receive the pin E, which passes through the side bars of the socket C and is riveted or otherwise secured to said socket. The pin E serves as a hinge to thill-iron D, and also to support the strain in holding back. In the slot in the head of the thill-iron D is placed a rubber block, F, which bears against the pin E and holds the convexed forward side of the thill-iron head firmly against the concaved inner surface of the forward end of the chamber C to keep the thill-iron in place and prevent rattling. The rubber block F may be protected from being worn by the pin E by a tubular washer placed upon the pin E or by a semi-tubular plate attached to the face of the said rubber block F and resting against the said pin E. The shank of the thill-iron D should be curved to form a seat for the ends of the thills and to correspond with the curve of said thills. By this construction, by raising the thills, the thill-irons D can be readily raised from the socket C, but the coupling cannot be or become uncoupled when the thills are in any position in which they can possibly be while attached to a horse.

Having thus described my invention, I claim as new and desire to secure by Letters Patent—

The chamber C, thill-iron D, pin E, and rubber block F, constructed and arranged in connection with each other and with the axle-clip, substantially as herein shown and described, and for the purposes set forth.

JAMES T. HARDS.

Witnesses:
 JACOB RUCH,
 CHARLES BOYES.